United States Patent
Tseng et al.

(10) Patent No.: US 11,528,264 B2
(45) Date of Patent: *Dec. 13, 2022

(54) MERGED VIDEO STREAMING, AUTHORIZATION, AND METADATA REQUESTS

(71) Applicant: Google LLC, Mountain View, CA (US)

(72) Inventors: Yu-Ting Tseng, Millbrae, CA (US);
Pawel Jurczyk, Newton, MA (US);
Sean Watson, San Francisco, CA (US);
Matthew Dalcin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 16/780,785

(22) Filed: Feb. 3, 2020

(65) Prior Publication Data

US 2020/0177575 A1     Jun. 4, 2020

Related U.S. Application Data

(63) Continuation of application No. 16/109,316, filed on Aug. 22, 2018, now Pat. No. 10,554,651, which is a continuation of application No. 15/244,989, filed on Aug. 23, 2016, now Pat. No. 10,091,192.

(51) Int. Cl.
| | |
|---|---|
| *H04L 29/06* | (2006.01) |
| *H04L 9/40* | (2022.01) |
| *H04L 43/08* | (2022.01) |
| *G06Q 30/02* | (2012.01) |
| *H04L 65/612* | (2022.01) |
| *H04L 65/75* | (2022.01) |
| *H04L 67/53* | (2022.01) |

(52) U.S. Cl.
CPC ....... *H04L 63/083* (2013.01); *G06Q 30/0277* (2013.01); *H04L 43/08* (2013.01); *H04L 63/0428* (2013.01); *H04L 63/06* (2013.01); *H04L 63/062* (2013.01); *H04L 63/10* (2013.01); *H04L 63/102* (2013.01); *H04L 65/612* (2022.05); *H04L 65/762* (2022.05); *H04L 65/765* (2022.05); *H04L 67/53* (2022.05)

(58) Field of Classification Search
CPC ............... H04L 63/083; H04L 63/0428; H04L 63/062; H04L 63/10; H04L 63/102; H04L 63/4084
USPC ....................................................... 713/168
See application file for complete search history.

(56) References Cited

U.S. PATENT DOCUMENTS

| | | | |
|---|---|---|---|
| 8,196,194 B2 * | 6/2012 | Lindholm | H04L 65/607 713/168 |
| 2012/0185693 A1 * | 7/2012 | Chen | H04N 21/4405 713/168 |

* cited by examiner

*Primary Examiner* — Longbit Chai
(74) *Attorney, Agent, or Firm* — Lowenstein Sandler LLP

(57) ABSTRACT

A streaming server receives a first request to view the media item from the client device via a connection between the client device and the streaming server. An encrypted portion of the media item is provided to the client device. A cryptography key is sent to the client device for decrypting the encrypted portion of the media item by the client device to facilitate the playback of the decrypted portion of the media item. A verification is received to determine whether the client device is authorized to play the decrypted media item.

20 Claims, 4 Drawing Sheets

MERGED VIDEO STREAMING, AUTHORIZATION, AND METADATA REQUESTS

RELATED APPLICATION

This application is a continuation of U.S. patent application Ser. No. 16/109,316, filed on Aug. 22, 2018, which is a continuation of U.S. patent application Ser. No. 15/244,989, filed on Aug. 23, 2016, the entire contents of which are hereby incorporated by reference herein.

TECHNICAL FIELD

This disclosure relates to the field of content media streaming and, in particular, to a merged video streaming, authorization, and metadata requests.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (e.g., client devices such as smart phones, cellular phones, laptop computers, desktop computers, netbooks, tablet computers) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by a processing device of a streaming server, a first request to view a media item from a client device via a connection between the client device and the streaming server; sending a second request to an authorization server to verify that the client device is authorized to play the media item; prior to receiving a response from the authorization server, providing, by the processing device, an encrypted portion of the media item to the client device via the connection; receiving, from the authorization server, a verification that the client device is authorized to play the media item; and sending, by the processing device via the connection between the client device and the streaming server, a cryptography key for decrypting the encrypted portion of the media item to the client device.

In some implementations, the method also includes: responsive to sending the second request to the authorization server, receiving, from the authorization server, one or more advertisements to be provided with the media item; and sending the one or more advertisements to the client device via the connection between the client device and the streaming server.

In some implementations, the method also includes: extracting an unencrypted initial segment from a video header associated with the media item; and sending, with the encrypted portion of the media item, the unencrypted initial segment extracted from the video header to the client device, via the connection between the client device and the streaming server, to initialize a media codec associated with the unencrypted initial segment and the media item. In some implementations, the method also includes sending one or more streaming server hostnames to the client device via the connection between the client device and the streaming server.

In some implementations, the method also includes: sending, to the client device, one or more video headers that indicate alternative video qualities associated with the media item and a number of media bytes expected to be streamed by the streaming server. In some implementations, the method also includes: determining a throughput estimate associated with the client device and the streaming server; and sending the throughput estimate to the client device via the connection between the client device and the streaming server. In some implementations, the method also includes encrypting a portion of the media item to produce the encrypted portion of the media item with the cryptography key, the cryptography key being an ephemeral per-request key.

In some implementations, the streaming server is comprised by a third-party content delivery network. In another implementation, a first-party streaming server may be located in a third-part facility. In these implementations, the first request to view a media item is encrypted by the client device, and the streaming server is not capable of decrypting the first request. In some implementations, the second request comprises the encrypted first request. In some implementations, the verification that the client device is authorized to play the media item is unencrypted.

In another aspect of the disclosure, a method includes sending, by a processing device of a client device, a request to view a media item, wherein the request is sent via a single connection between the client device and a streaming server; receiving, via the single connection, an encrypted portion of the media item prior to receiving a verification that the client device is authorized to play the media item; subsequent to receiving the encrypted portion of the media item, receiving, via the single connection, a cryptography key indicating that the client device is authorized to play the media item; decrypting, by the processing device, the encrypted portion of the media item; and beginning a playback of the decrypted portion of the media item.

In some implementations, the method further includes: receiving, from the streaming server via the single connection, an unencrypted initial segment from a video header associated with the media item; and initializing a media codec associated with the unencrypted initial segment and the media item. In some implementations, the method further includes receiving, from the streaming server, one or more video headers that indicate alternative video qualities associated with the media item.

In some implementations, the method further includes: receiving a throughput estimate determined by the streaming server via the single connection; and based on the throughput estimate, determining an initial playback video quality from the alternative video qualities associated with the media item.

Computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Figure 1:
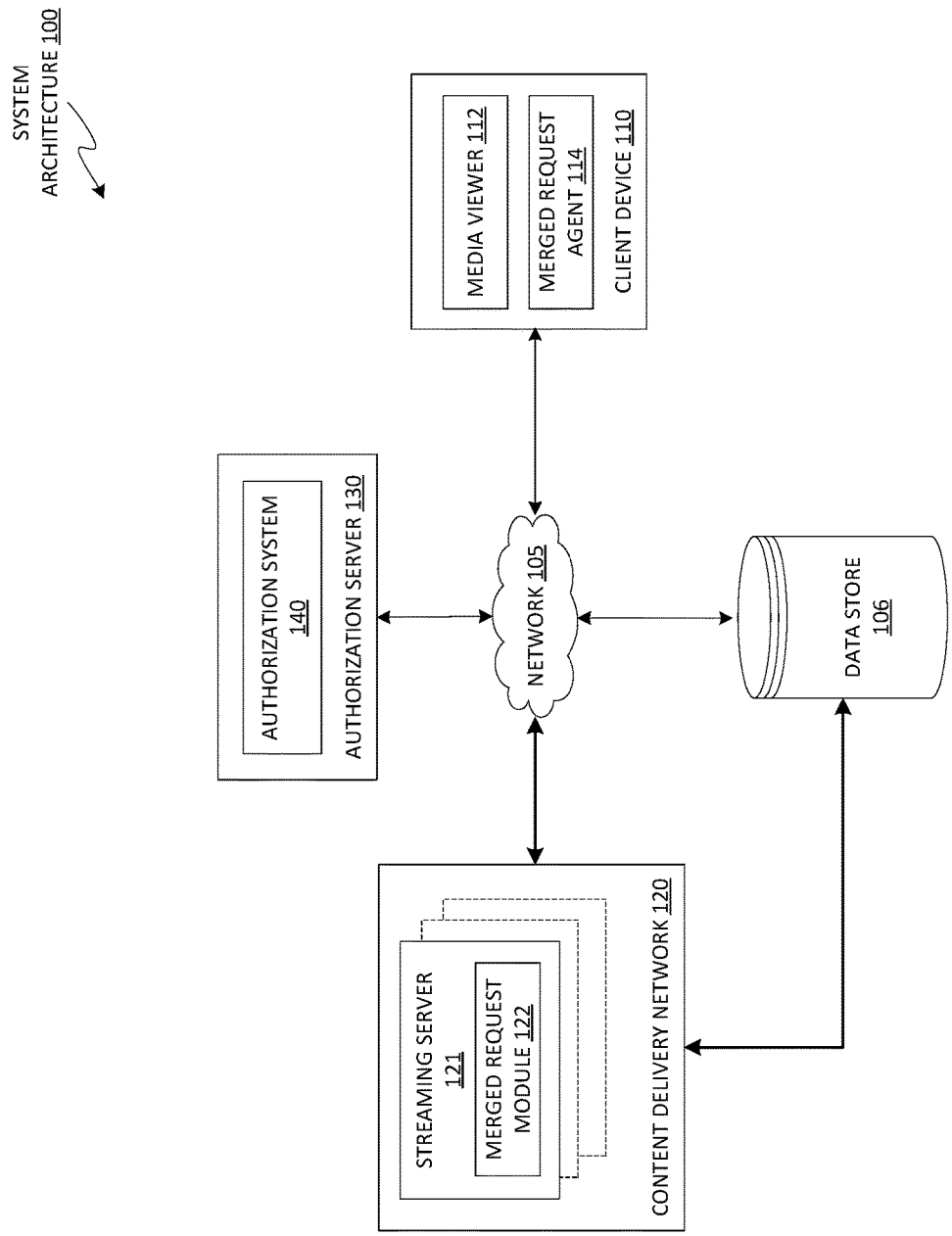
FIG. 1 is a block diagram illustrating an exemplary network architecture in which implementations of the present disclosure may be implemented.

Aspects of the disclosure are directed to merged video streaming, authorization, and metadata requests. In particular, implementations are described for providing requested video items and video metadata to client devices of users of a content sharing platform using a content delivery network, where such video items and metadata are provided securely and with minimum latency.

Existing solutions for online video streaming using a content delivery network (CDN) may involve several back and forth operations between a client device and various servers before the client device can start playing a video. These operations may include, for example: (1) the client device sending a request to a business logic server, via a network connection between the client device and the business logic server, to authorize the playback; (2) the business logic server requesting authorization for the client device from an authorization server; (3) the client device receiving authorization from the authorization server via a network connection between the client device and the authorization server; (4) the client device fetching video metadata, which specifies a streaming server and video parameters (e.g., one or more streaming servers from which to stream the requested video, the size of the video, other available video sizes and/or qualities, etc.) from the authorization server via the network connection between the client device and the authorization server; and (5) the client device fetching video and audio streams from the specified streaming server (e.g., a CDN server), via a network connection between the client device and the streaming server. The above operations typically involve establishing and maintaining multiple network connections between the client device and several servers, which requires significant processing resources, increases network bandwidth and contributes to latency. In addition, the above operations are usually performed in sequential order (one after another) and may take a non-trivial amount of time to complete, thereby also resulting in significant latency from the time streaming playback of a video item is requested to the time the video item begins to play.

Aspects of the present disclosure address the above and other deficiencies by limiting the number of required network connections and reducing the number of operations involved in providing the requested streamed content to a client device. In particular, aspects of the present disclosure enable a client device to send a single request for streamed content to a streaming server in the CDN and obtain the initial portion of the requested streamed content via a single connection with the streaming server, thereby significantly reducing the latency from the time streaming playback of a video item is requested to the time the video item begins to play.

For example, when a user opens a media streaming application on a client device (e.g., a mobile device), a connection with a streaming server may be established before any content is requested by the user. In one implementation, the same connection is maintained between the client device and the mobile device throughout the operations described herein. The user may then request that a particular media item be streamed to the client device. This first request may be received by the streaming server via the single connection which has already been established by the client device. Advantageously, by sending the first request over the already established connection, the client device does not have to establish a new connection each time a request is to be sent.

When the streaming server receives the first request from the client device, the streaming server may send a second request to an authorization server. The second request may ask for authorization to stream the requested media item to the client device and for metadata associated with the requested media item. Before receiving a response from the authorization server, the streaming server may encrypt the media item and provide an encrypted portion of the media item to the client device via the single connection. Advantageously, providing an encrypted portion of the requested media item to the client device before the streaming of the media item has been authorized reduces playback latency on the client device by loading the media item on the client device in parallel with obtaining playback authorization for the media item. Because the initially sent portion of the media item is encrypted, and the client device does not yet have the key to decrypt the media item, playback of the media item cannot begin without authorization, thereby ensuring that the media item can only be watched by authorized users. In one implementation, when the requested media item is not located on the streaming server connected to the client device, the streaming server may determine which streaming server is responsible for the requested media item, and proxy the video stream from that server to the client device.

Responsive to sending the second request to the authorization server, the streaming server may receive, from the authorization server, authorization to provide the media item and metadata associated with the media item to the client device. The streaming server may then send the metadata and a cryptography key associated with the encrypted media item to the client device via the single connection. With the cryptographic key, the client device may decrypt the received, encrypted portion of the media item and immediately begin playback.

If authorization is not received from the authorization server, the streaming server may not send metadata or a cryptography key to the client device so the client device may not decrypt the media item to begin playback. In the case where playback authorization is not received, the already encrypted portion of the media item sent to the client device may be removed from the client device after a predefined time period.

Accordingly, aspects of the present disclosure limit the number of network connections of a client device that are needed to initiate playback of a requested media item, thereby reducing the amount of computing (processing) resources, as well as network bandwidth and latency. In addition, by performing operations related to the loading of the requested media item in parallel, aspects of the present disclosure further reduce playback latency of the requested media item.

It should be noted, that aspects of the present disclosure apply to streaming media items for convenience, as well as non-streaming media items (e.g., media items loaded to a client device before their playback).

Furthermore, the present disclosure often references videos for simplicity and brevity. However, the teaching of the present disclosure can be applied to various types of content or media items, including for example, video, audio, text, images, program instructions, etc. The media items referred to herein represent viewable and/or shareable media items.

FIG. 1 illustrates an example system architecture 100, in accordance with one implementation of the disclosure. The system architecture 100 includes a client device 110, a network 105, a data store 106, a content delivery network (CDN) 120, and an authorization server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

CDN 120 may include one or more streaming servers 121. In one implementation, the CDN 120 may be one or more computing devices (such as a rackmount server, a router computer, a server computer (e.g., streaming server 121), a personal computer, a mainframe computer, a laptop computer, a tablet computer, a network connected television, a desktop computer, etc.), data stores (e.g., hard disks, memories, databases, data store 106), networks, software components, and/or hardware components that may be used to provide a user with access to media items and/or provide the media items to the user. For example, CDN 120 may allow a user to consume (e.g., via streaming), upload, and/or search for, media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user".

Streaming server 121 may include media items. Examples of media items can include, and are not limited to, digital video, digital movies, digital photos, digital music, website content, social media updates, electronic books (e-books), electronic magazines, digital newspapers, digital audio books, electronic journals, web blogs, real simple syndication (RSS) feeds, electronic comic books, software applications, etc. In some implementations, a media item is also referred to as a content item.

A media item may be consumed via the Internet and/or via a mobile device application. For brevity and simplicity, an online video (also hereinafter referred to as a video) is used as an example of a media item throughout this document. As used herein, "media," "media item," "online media item," "digital media," "digital media item," "content," and "content item" can include an electronic file that can be executed or loaded using software, firmware or hardware configured to present the digital media item to an entity. In one implementation, the media servers 121 of CDN 120 may store the media items using the data store 106. The media servers 121 120 may also store playlists created by users, third parties, or automatically. A playlist may include a list of content items (e.g., videos) that can be played (e.g., streamed) in sequential or shuffled order.

In one implementation, streaming servers 121 may be one or more computing devices (e.g., a rackmount server, a server computer, etc.). Streaming servers 121 may be included in the CDN 120 or be part of a different system. Each streaming server 121 may host a merged request module 122. In another implementation, a single merged request module of CDN 120 may service more than one streaming server 121, and may reside on some but not all streaming servers 121 or on a separate server connected to the streaming servers 121. Merged request module 122 may be responsible for performing server-side operations related to merging video streaming, authorization, and metadata requests, as described in the present disclosure. For example, merged request module 122 may be responsible for receiving a request from a client device 110 to view a media item stored on CDN 120 and/or data store 106. The request may be received by merged request module 122 via a single connection between streaming server 121 and client device 110 (e.g., via network 105). Once received, merged request module 122 may send an authorization request to an authorization system 140 of an authorization server 130 to verify that the client device is authorized to play the media item.

In one implementation, authorization server 130 may be one or more computing devices (e.g., a rackmount server, a server computer, etc.). The authorization server 130 may include authorization system 140, which may be responsible for determining whether a particular client device has authority to play a requested media item.

In one implementation, prior to receiving a response from authorization system 140, merged request module 122 may provide an encrypted portion of the media item to the client device via the connection between the streaming server 121 and client device 110. Advantageously, sending the encrypted portion of the media item to client device 110 at a very early stage (i.e., in parallel to the authorization process of authorization system 140) reduces the amount of time between the user's request of a video to the playback of the requested video. Furthermore, because the sent portion of the media item is encrypted, playback may not begin on the client device 110 until the client devices receives a verification that the client device is authorized to play the media item.

Merged request module 122 may be responsible for receiving, from the authorization server 130, a verification that the client device is authorized to play the media item. In one implementation, once verification is received, merged request module 122 may send, via the connection between the client device and the streaming server, a cryptography key for decrypting the encrypted portion of the media item to the client device.

In various implementations, client device 110 may include computing devices such as personal computers (PCs), laptops, mobile phones, smart phones, tablet computers, network connected televisions, netbook computers etc. It is worth mentioning that although only a single client device is displayed in FIG. 1, any system 100 may include any number of client devices, each capable of establishing connections to and streaming media from the CDN 120. The client device 110 may include a media viewer 112. In one implementation, the media viewer 112 may be an application that allows a user to view content, such as images, videos, web pages, documents, etc. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user. The media viewer 112 may also display an embedded media player (e.g., a Flash® player or an HTML5 player) that is embedded in a web page (e.g., a web page that may provide information about a product sold by an online merchant). In another example, the media viewer 112 may be a standalone application (a mobile application or "app") that allows users to search for digital media items (e.g., digital videos, digital images, electronic books, etc.) and can present a media player to play video and audio media items for the user. According to aspects of the present disclosure, the media viewer 112 may be a application that allows users to view and search for streaming media items. The media viewer 112 may be provided to the client device 110 by the authorization server 130 and/or CDN 120. In some implementations, the authorization server 130 and/or CDN 120 are part of a content sharing platform that serves content (e.g. media items) stored on the CDN to client devices. In one embodiment, a CDN may include a globally distributed network of proxy servers deployed in multiple data centers.

In one implementation, client device 110 includes merged request agent 114. Merged request agent 114 may perform client-side operations related to merged video streaming, authorization, and metadata requests, as described in the present disclosure. In various implementations of the present disclosure, merged request agent 114 may be responsible for some of the same tasks as the server-side merged request module 122.

In one implementation, merged request agent 114 may be responsible for sending a request to view a media item when a user of client device 110 indicates a desire to view the media item on client device 110. The request may be sent from client device 110 to CDN 120, via a single connection, for example. Merged request agent 114 may receive, via the single connection, an encrypted portion of the media item prior to receiving verification that the client device is authorized to play the media item. This "preloading" of a portion of the media item may allow for faster playback once the client device is verified.

In one implementation, subsequent to receiving the encrypted portion of the media item, the merged request agent 114 of client device 110 may receive, via the single connection to streaming server 121, a cryptography key indicating that the client device is authorized to play the media item. With the cryptography key received from streaming server 121, merged request agent 114 may decrypt the encrypted portion of the media item that was already received, and begin a playback of the decrypted portion of the media item.

It should be noted that functions described in one implementation as being performed by the CDN 120 can also be performed on the client device 110 in other implementations, and vice-a-versa, if appropriate. Furthermore, functions described in one implementation as being performed by the CDN 120 can also be performed on the authorization server 130 in other implementations, and vice-a-versa, if appropriate.

In addition, the functionality attributed to a particular component can be performed by different or multiple components operating together. The CDN 120 can also be accessed as a service provided to other systems or devices through appropriate application programming interfaces, and thus is not limited to use in websites. Furthermore, although components of system 100 are presently described as establishing connections with each other via network 105, it is possible that each component may directly connect to another without going through a network. For example, a streaming server 121 of CDN 120 may be directly connected to an authorization system 140 of an authorization server 130. Furthermore, streaming server 121 and authorization server 140 may be the same server.

Although some implementations of the disclosure are discussed in terms of a content sharing platform, implementations may also be generally applied to any type of platform providing connections between users.

In situations in which the systems discussed here collect personal information about users, or may make use of personal information, the users may be provided with an opportunity to control whether the CDN 120, authorization server 130, and client device 110 collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by CDN 120, authorization server 130, and client device 110.

Figure 2:
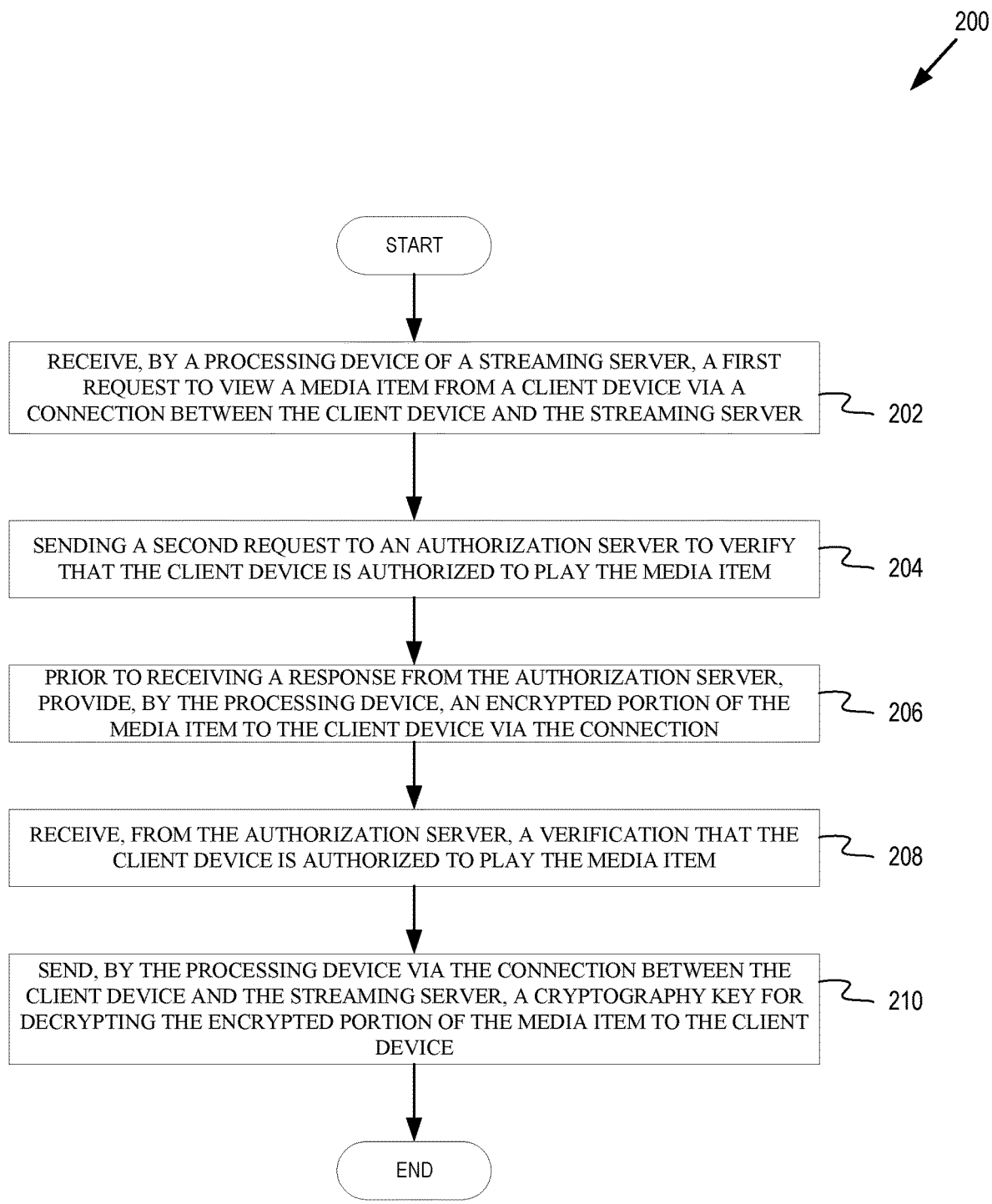
FIG. 2 is a flow diagram illustrating a server-side method for merged video streaming, authorization, and metadata request, according to an implementation.

FIG. 2 is a flow diagram illustrating a server-side method for merged video streaming, authorization, and metadata request, according to an implementation. The method 200 may be performed by processing logic that comprises hardware (e.g., circuitry, dedicated logic, programmable logic, microcode, etc.), software (e.g., instructions run on a processing device to perform hardware simulation), or a combination thereof. In one implementation, merged request module 122 of streaming server 121 on CDN 120 performs method 200.

Referring to FIG. 2, at block 202, processing logic receives, by a processing device of a streaming server, a first request to view a media item from a client device via a connection between the client device and the streaming server. In one implementation, the first request is received from a client device when a user of the client device indicates a desire to watch (e.g., stream) a media item on the client device. At block 204, processing logic sends a second request to an authorization server to verify that the client device is authorized to play the media item. In one implementation, a client device may be authorized to play a particular media item based on age restrictions of a user of the client device and/or geographical restrictions of the user of the client device and the media item. In another implementation, a client device may be authorized to play a particular media item based on membership in a subscription that includes access to the media item and/or the receiving of a one-time payment for access to a paid-for media item. Authorization may be based on client device settings, restrictions, or requirements. For example, certain types of media items may be eligible for playback on only certain types of device. In various other implementations, authorization to access (e.g., stream, play, etc.) a particular media item may be based on other criteria related to the client device, user of the client device, and/or media item itself.

At block 204, processing logic provides, by the processing device, an encrypted portion of the media item to the client device via the connection, prior to receiving a response from the authorization server. For example, a streaming server may immediately (e.g., substantially in real-time) begin sending the encrypted portion of the media item to the client device upon receiving the request to view the media item from the client device. The streaming server may begin sending the encrypted portion either before or after sending the authorization request to the authorization server. Since the portion of the media item sent to the client device is encrypted, the client device may not be able to begin playback of the media item without authorization.

In one implementation, processing logic may encrypt a portion of the media item with a cryptography key upon receiving the first request from the client device. The cryptography key may be an ephemeral per-request key. Alternatively, processing logic may encrypt the portion and/or the entire media item prior to receiving the first request from the client device. Yet alternatively, processing logic may not need to encrypt the portion or entire media item because the media item or its portion(s) may be stored in an encrypted form (e.g., was previously encrypted by another server or component).

Sending the encrypted portion of the media item to the client device while waiting for authorization from the authorization server allows the client device to have this portion of the media item for immediate playback once authorization is received, instead of waiting to receive authorization, and then downloading the media item, and only then beginning playback. In one implementation a portion of a media item may be determined based on playback time of the media item. For example, an encrypted portion sent by processing logic to a client device may correspond to a 2.5 second or 7 second starting portion of the media item. In other implementations, other time thresholds may be used to determine the portion. In another implementation, the encrypted portion may be determined based on a size threshold. For example, the encrypted portion may correspond to a 1 MB beginning portion of the media item. In other implementations, other thresholds may be used to determine what the initial portion should be provided to the client device.

In one implementation, processing logic may extract an unencrypted initial segment from a video header associated with the media item and send, with the encrypted portion of the media item, the unencrypted initial segment extracted from the video header to the client device. The initial segment may be sent via the connection between the client device and the streaming server. The initial segment may be sent to the client device to initialize a media codec associated with the unencrypted initial segment and the media item. Advantageously, this allows the client device to begin initializing the proper media codec, based on the initial segment from the video header, before receiving authorization to play the video.

In one implementation, the processing logic may send one or more streaming server hostnames to the client device via the connection between the client device and the streaming server. After the initial encrypted portion of the media item is played on the client device (after verification of authorization has been received), the remaining portion of the media item may be streamed from a different server than the initial streaming server. For example, there may be better servers from which to stream the remaining portion of the media item based on server load, throughput, proximity to the client device, and/or other factors. Upon receiving the one or more streaming server hostnames from the streaming server, the client device may determine that one of the servers identified by the one or more hostnames may be a better server from which to stream the remaining portion of the media item. For example, the client device may determine that the remaining portion may be streamed from a server that is closer to the client device or from a server that is less loaded than the current streaming server. In another implementation, the client device may determine that one of the servers identified by the one or more hostnames may have better throughput than the current server. The client device may make this determination by comparing any number of characteristics associated with the current server against characteristics associated with another available server. Upon making the determination, the client device may pre-warm a connection to the desired server so as to facilitate a seamless (e.g., lag-less) transition from streaming the initial portion to streaming the remaining portion of the media item.

In one implementation, processing logic receives, from the authorization server, in response to sending the second request to the authorization server, one or more additional content items (e.g., recommended content items, promotional content items, etc.) to be provided with the media item and sends the one or more additional content items to the client device via the connection between the client device and the streaming server. In one example, the authorization server may perform an advertisement bidding service to determine which promotional content items should be presented with the media item. The selected promotional content items may be displayed, before, during, or after playback of the media item on the client device.

At block 208, processing logic receives, from the authorization server, a verification that the client device is authorized to play the media item. Processing logic at block 208 may also receive additional information besides the verification from the authorization server. In one implementation, processing logic may receive one or more video headers that indicate alternative video qualities (e.g., media item qualities) associated with the media item. Users of the client device may be provided the alternative video qualities from which to select a desired option. In another implementation, processing logic may receive a number of media bytes expected to be streamed by the streaming server. Using this information, a client device or the streaming server may determine when, if at all, to transition the streaming of the media item from the original streaming server to an alternative streaming server.

In one implementation, processing logic may determine a throughput estimate associated with the client device and the streaming server and send the throughput estimate to the client device via the connection between the client device and the streaming server. Using the throughput estimate, the client device may determine which media item quality to default to for playback of the media item when playback first begins. A user of the client device may then select a different media item quality for playback from the alternative media item qualities available for the particular media item if the user chooses to do so.

At block 210, processing logic sends, by the processing device via the connection between the client device and the streaming server, a cryptography key for decrypting the encrypted portion of the media item to the client device. It should be mentioned that the cryptography key is sent to the client device if verification that the client device is authorized to play the media item is received. If verification is not received, processing logic may not send the cryptography key to the client device. Using the cryptography key to decrypt the already sent encrypted portion of the media item, the client device may immediately begin playback of the media item.

As discussed above, all communications between the client device and the streaming server may occur via the same connection. In other words, once the connection is established between the client device and the streaming server (e.g., this connection may be established upon loading of the application including the media view on the client device), all communications described herein between the client device and the streaming server may occur via the same connection.

In one implementation, the streaming server may be part of a third-party content delivery network. In such a case, it may be desirable to prevent the third-party streaming server from having unrestricted access to all communications between the client device and the authorization server. In this case, the first request to view the media item may be encrypted by the client device such that the streaming server is not capable of decrypting the first request (while the authorization server is capable of decrypting the request). Processing logic may simply forward the request to the authorization server without decrypting it. In response, processing logic may receive an unencrypted verification from the authorization server that that the client device is authorized to play the media item. The communications from the client device for the authorization server via the streaming server and the communications from the authorization server for the client device via the streaming server may be encrypted using a public-private pair encryption scheme.

Figure 3:
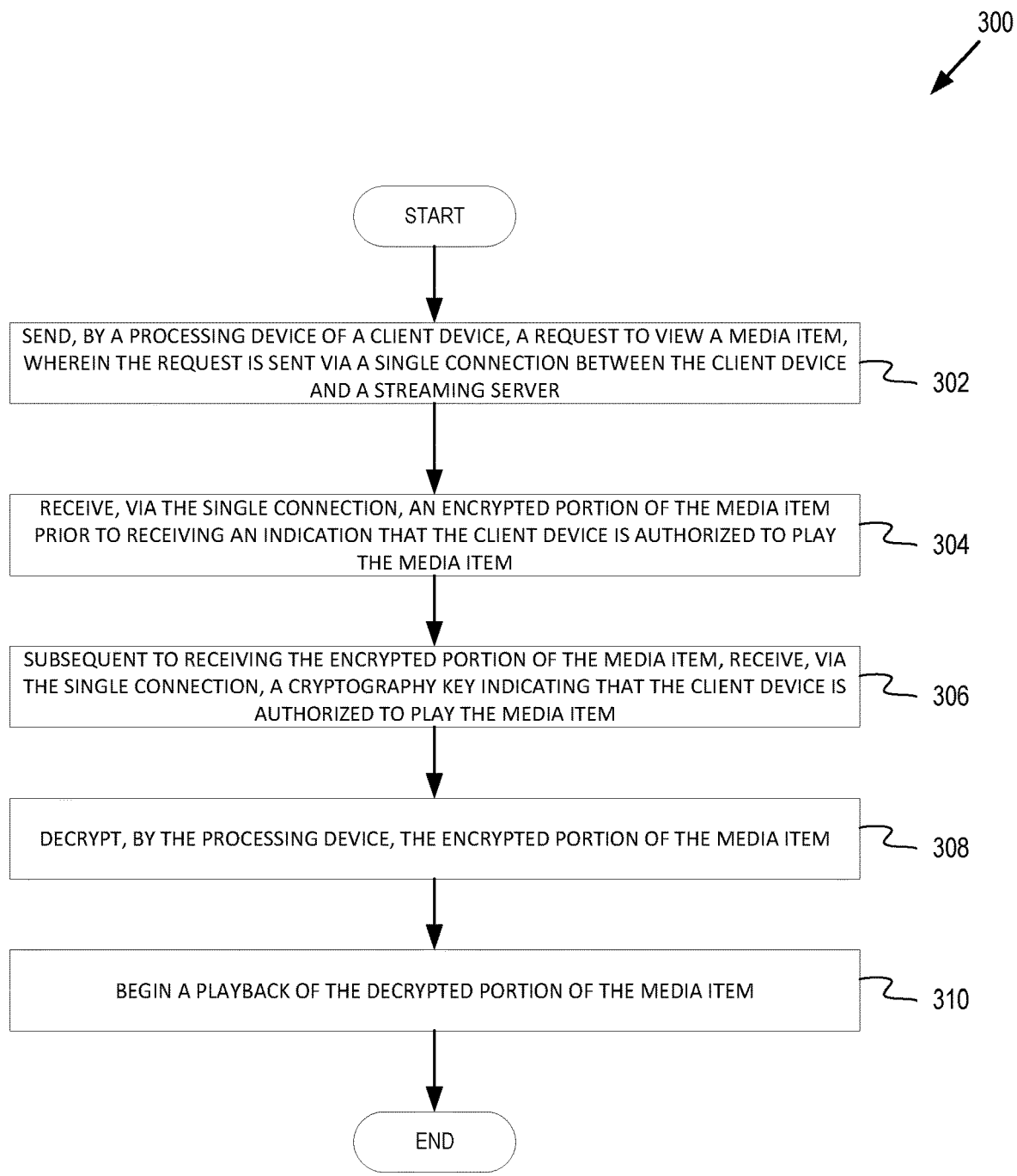
FIG. 3 is a flow diagram illustrating a client-side method for merged video streaming, authorization, and metadata request, according to some implementations.

FIG. 3 is a flow diagram illustrating a client-side method for merged video streaming, authorization, and metadata request, according to an implementation. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, merged request agent 114 of client device 110 performs method 300.

Referring to FIG. 3, at block 302, processing logic sends, by a processing device of a client device, a request to view a media item. The request may be sent via a single connection between the client device and a streaming server. At block 304, processing logic receives, via the same single connection, an encrypted portion of the media item prior to receiving an indication that the client device is authorized to play the media item. Subsequent to receiving the encrypted portion of the media item, at block 306 processing logic receives, via the single connection, a cryptography key indicating that the client device is authorized to play the media item, decrypts the encrypted portion of the media item (block 308) and begins a playback of the decrypted portion of the media item (block 310).

In one implementation, processing logic may receive, from the streaming server, one or more video headers that indicate alternative video qualities associated with the media item. As described herein, a user may select from available alternative media item qualities for media item playback. In another implementation, processing logic receives a throughput estimate determined by the streaming server via the single connection and based on the throughput estimate, determines an initial playback video quality from the alternative video qualities associated with the media item. In this way, a default playback quality that corresponds to the throughput may be determined and selected. In one implementation, the default playback quality may be based on other factors besides throughput, such as user preferences and/or client device specifications.

Figure 4:
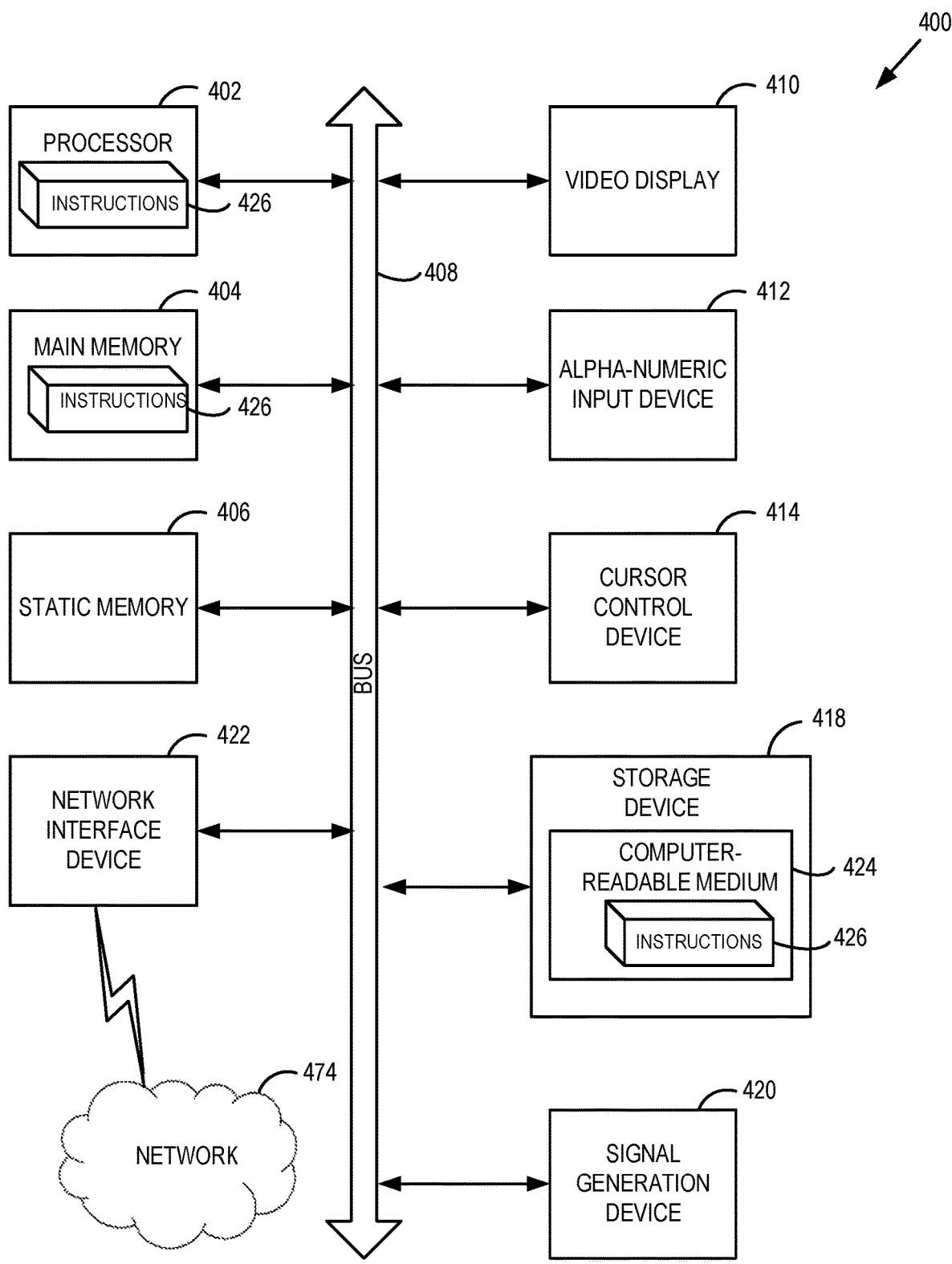
FIG. 4 is a block diagram illustrating one implementation of a computer system, according to an implementation.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a network connected television, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 400 may be representative of a server, such as streaming server 121 or authorization server 130, executing a merged request module 122 or authorization system 140, as described with respect to FIGS. 1-3. In another implementation, computer system 400 may be representative of a client device, such as client device 110, executing a merged request agent 114, as described with respect to FIGS. 1-3.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a computer-readable storage medium 424 (also referred to as a machine-readable storage medium), on which is stored one or more set of instructions 426 (e.g., software) embodying any one or more of the methodologies of functions described herein. The instructions 426 may also reside, completely or at least partially, within the main memory 404 and/or within the processing device 402 during execution thereof by the computer system 400; the main memory 404 and the processing device 402 also constituting machine-readable storage media. The instructions 426 may further be transmitted or received over a network 474 via the network interface device 422.

The computer-readable storage medium 424 may also be used to store instructions to perform a method for merged video streaming, authorization, and metadata request, as described herein. While the computer-readable storage medium 424 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method of authorizing a client device to playback a media item comprising:
   receiving, by a processing device of a streaming server, a first request to view the media item from the client device via a connection between the client device and the streaming server;
   providing, by the processing device of the streaming server, an encrypted portion of the media item to the client device, wherein a cryptography key is sent to the client device for decrypting the encrypted portion of the media item by the client device to facilitate the playback of the decrypted portion of the media item; and
   subsequent to the providing of the encrypted portion of the media item to the client device, receiving, by the processing device of the streaming server, a verification identifying whether the client device is authorized to play the media item.

2. The method of claim 1, further comprising:
   responsive to receiving the first request, sending a second request to an authorization server to verify that the client device is authorized to play the media item, wherein the verification is received from the authorization server in response to the second request.

3. The method of claim 2, wherein the second request comprises an encrypted first request.

4. The method of claim 3, wherein the verification that the client device is authorized to play the media item is unencrypted.

5. The method of claim 1, further comprising:
   extracting an unencrypted initial segment from a video header associated with the media item; and
   sending the unencrypted initial segment extracted from the video header to the client device to initialize a media codec associated with the unencrypted initial segment and the media item.

6. The method of claim 5, wherein the unencrypted initial segment is sent with the encrypted portion of the media item.

7. The method of claim 1, further comprising:
   sending, to the client device, one or more video headers that indicate alternative video qualities associated with the media item and a number of media bytes expected to be streamed by the streaming server.

8. The method of claim 1, further comprising:
   determining a throughput estimate associated with the client device and the streaming server; and
   sending the throughput estimate to the client device via the connection between the client device and the streaming server.

9. The method of claim 1, further comprising encrypting a portion of the media item to produce the encrypted portion of the media item with the cryptography key, the cryptography key being an ephemeral per-request key.

10. The method of claim 1, wherein:
the streaming server is part of a third-party content delivery network,
the first request to view the media item is encrypted by the client device, and
the streaming server does not decrypt the first request.

11. A method of authorizing a client device to playback a media item comprising:
sending, by a processing device of the client device, a first request to view the media item to a streaming server, wherein the first request is sent via a connection between the client device and the streaming server;
receiving an encrypted portion of the media item provided by the streaming server, wherein the encrypted portion of the media item is provided by the streaming server prior to verifying whether the client device is authorized to play the media item;
subsequent to receiving the encrypted portion of the media item, receiving a cryptography key indicating that the client device is authorized to play the media item;
decrypting, by the processing device of the client device, the encrypted portion of the media item using the cryptography key; and
beginning the playback of the decrypted portion of the media item.

12. The method of claim 11, further comprising:
receiving an unencrypted initial segment from a video header associated with the media item; and
initializing a media codec associated with the unencrypted initial segment and the media item.

13. The method of claim 11, further comprising receiving, from the streaming server, one or more video headers that indicate alternative video qualities associated with the media item.

14. The method of claim 13, further comprising:
receiving a throughput estimate determined by the streaming server; and
based on the throughput estimate, determining an initial playback video quality from the alternative video qualities associated with the media item.

15. A system of authorizing a client device to playback a media item comprising:
a memory; and
a processing device coupled to the memory, wherein the processing device is to:
receive a first request to view the media item from the client device via a connection between the client device and a streaming server; and
provide an encrypted portion of the media item to the client device, wherein a cryptography key is sent to the client device for decrypting the encrypted portion of the media item by the client device to facilitate the playback of the decrypted portion of the media item; and
subsequent to the providing of the encrypted portion of the media item to the client device, receive a verification identifying whether the client device is authorized to play the media item.

16. The system of claim 15, the processing device further to:
responsive to receiving the first request, send a second request to an authorization server to verify that the client device is authorized to play the media item, wherein the verification is received from the authorization server in response to the second request.

17. The system of claim 15, the processing device further to:
extract an unencrypted initial segment from a video header associated with the media item; and
send the unencrypted initial segment extracted from the video header to the client device to initialize a media codec associated with the unencrypted initial segment and the media item.

18. A non-transitory machine-readable storage medium storing instructions to authorize a client device to playback a media item, wherein the instructions responsive to execution by a processing device, cause the processing device to:
receive a first request to view the media item from the client device via a connection between the client device and a streaming server; and
provide an encrypted portion of the media item to the client device, wherein a cryptography key is sent to the client device for decrypting the encrypted portion of the media item by the client device to facilitate the playback of the decrypted portion of the media item; and
subsequent to the providing of the encrypted portion of the media item to the client device, receive a verification identifying whether the client device is authorized to play the media item.

19. The non-transitory machine-readable storage medium of claim 18, the processing device further to:
determine a throughput estimate associated with the client device and the streaming server; and
send the throughput estimate to the client device.

20. The non-transitory machine-readable storage medium of claim 18, the processing device further to:
extract an unencrypted initial segment from a video header associated with the media item; and
send the unencrypted initial segment extracted from the video header to the client device to initialize a media codec associated with the unencrypted initial segment and the media item.

* * * * *